U.S. Patent   July 27, 1976   3,971,408
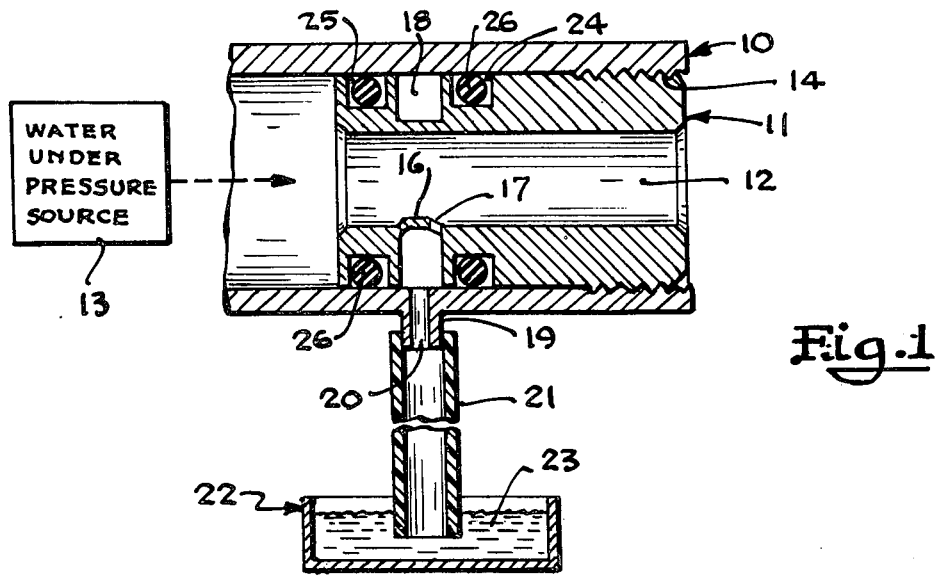
Fig.1
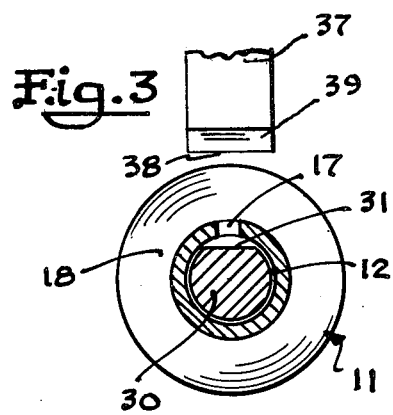
Fig.3
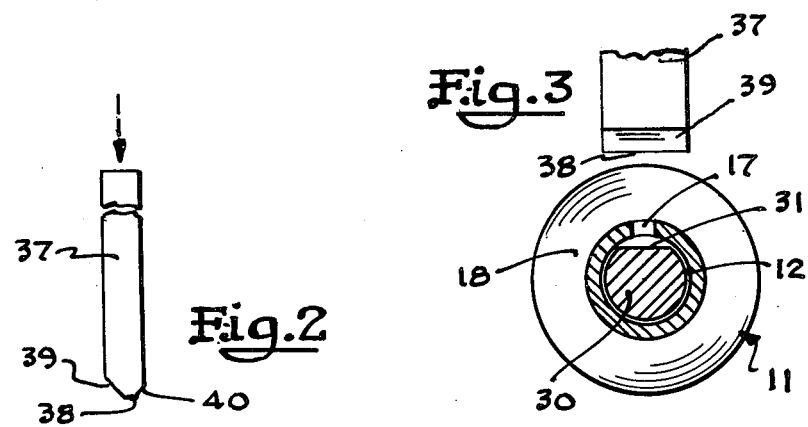
Fig.2
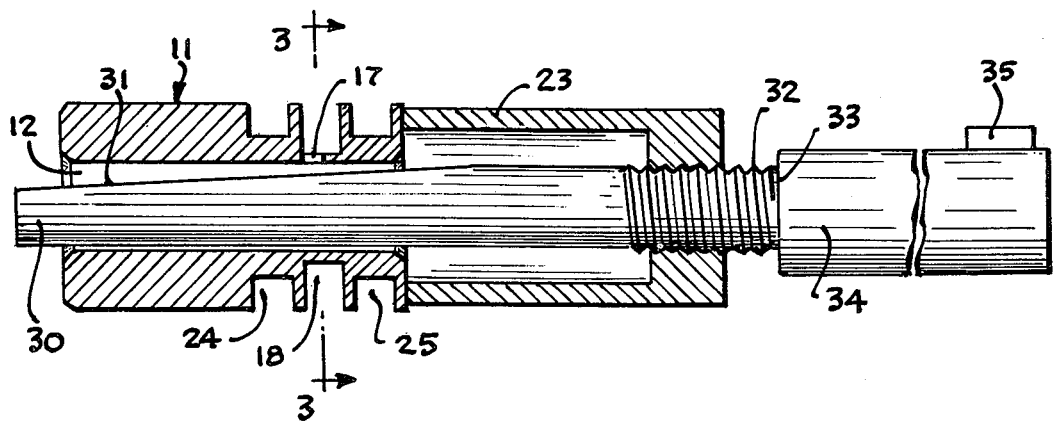

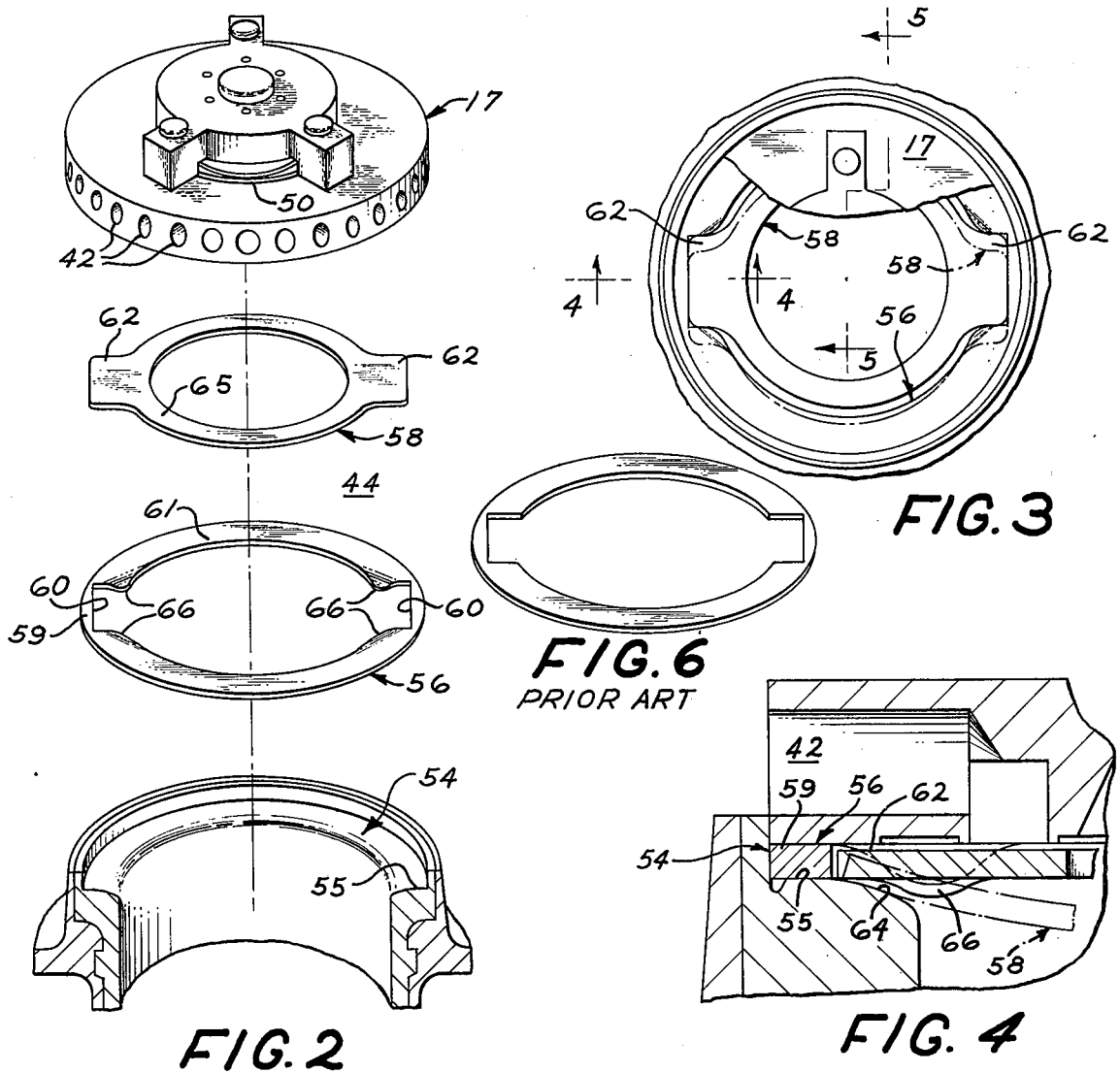
FIG.3
FIG.6
PRIOR ART
FIG.2
FIG.4
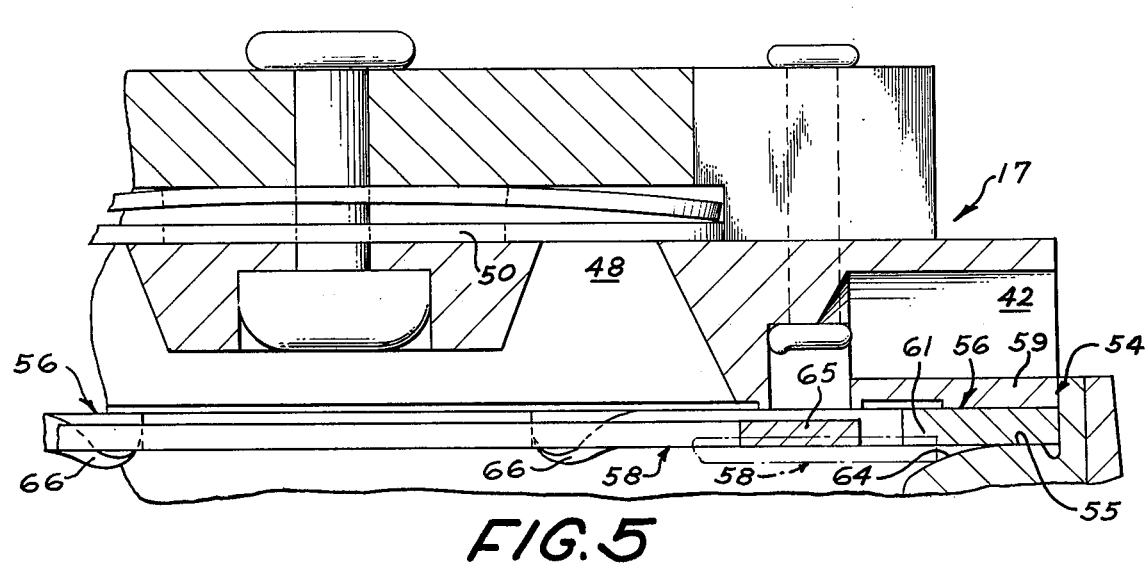
FIG.5

SPRAYER NOZZLE CONSTRUCTION

RELATED APPLICATION

The present application is a division of my copending application Ser. No. 348,034, filed Apr. 5, 1973, now U.S. Pat. No. 3,861,194, which in turn was copending with and a division of my application Ser. No. 125,129, filed Mar. 17, 1971 now U.S. Pat. No. 3,760,479.

BACKGROUND AND SUMMARY OF THE INVENTION

The present invention was devised for producing parts of a sprayer of a type that is fastened to the end of a garden hose to aspirate a treating solution from a container and mix the solution with the water from the garden hose. The aspiration takes place by means of a Venturi in the sprayer.

Such sprayers are designed so as to mix predetermined proportions of the aspirated liquid with the water flowing through the garden hose. Thus, the user of the sprayer will know the dosage of weed killer, pesticide, etc., that is being applied through the use of the sprayer. The specific proportions are achieved by the configuration of the Venturi; that is, with a Venturi of one design the proportions may be 1 in 100, while with another design that may be 5 or 10 in 100, etc. To achieve the desired proportions requires substantial accuracy in the manufacture of the Venturi.

One of the past practices for Venturi manufacture has been to define a step in the Venturi tube by two concentric openings of different diameters, the step being at the plane where the two openings meet. Merely drilling two such openings through a body part did not produce sufficient accuracy to consistently produce Venturies having the desired mixing proportion. It has been necessary to ream at least one of the openings, and often both, to achieve sufficient accuracy in the opening sizes. Even so, the process of reaming required considerable skill and experience to consistently come up with parts having the desired mixing capabilities. It was, you might say, an "art" to produce such parts.

This method of manufacture was inherently expensive. Such expense was particularly undesirable because the overall sprayers are a relatively inexpensive item; that is, purchasers would not buy the item at a particularly greater price. They would use some alternative method of achieving the same result rather than buy the more expensive sprayer.

The principal object of the present invention is to provide an alternative procedure for making the Venturi in such sprayer nozzles. Not only does the present invention achieve a substantial reduction in cost of manufacture, but the manufacturing procedure is not an "art" and may be performed by a relatively inexperienced worker while still achieving the required accuracy in the operation of the finished sprayer. As a matter of fact, if tests should show that the parts being produced were outside the range desired, it is a very simple matter to correct the manufacturing operation to bring the product back within the required tolerance range.

Further objects and advantages will be apparent from the following.

DESCRIPTION OF THE DRAWINGS

FIG. 1 is a section through a sprayer nozzle produced in accordance with the present invention with a diagrammatic illustration of the use of the nozzle;

FIG. 2 is a longitudinal section illustrating the process of manufacture of the Venturi; and FIG. 3 is a section viewed at line 3—3 of FIG. 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

A sprayer, somewhat diagrammatically illustrated in FIG. 1, comprises an outer body part 10 and an inner body part 11. The inner body part defines a passage 12, the upstream end of which communicates with a source 13 of water under pressure, as, for example, a garden hose. Means are provided, as, for example, the threaded connection 14 to prevent the force of the water from separating the two body parts. At the downstream end of passage 12 are other devices, not shown, for causing the water from the passage to achieve the desired spray or stream discharge.

Intermediate the ends of passage 12 is a Venturi formed by an inwardly projecting step 16 and an opening or orifice 17 at the downstream end of the step. Opening 17 communicates between passage 12 and an annular slot 18 on the outside of body part 11. Externally of body part 10 is a tubular boss 19. A hole 20 extends through boss 19 and the wall of body part 10 to communicate with slot 18. A hose 21 is frictionally secured to boss 19 and extends into a container 22 of liquid 23 to be aspirated into passage 12. At each side of slot 18 are other slots 24 and 25, respectively. These latter two slots hold "O" rings 26 which are in compression between body parts 10 and 11 to seal off slot 18.

As the water from source 18 flows downstream (to the right in FIG. 1) and over step 16 the flow over the step produces a low pressure at orifice 17. This low pressure causes an aspiration of the liquid 23 up through hose 21, opening 20 and orifice 17 where the liquid enters passage 12 and intermingles with the water from a source 13.

When the inner body part 11 is first manufactured, it is annular in configuration as best seen in FIGS. 2 and 3. The opening 12 is cylindrical and the base of slot 18 is circular in cross section and relatively thin compared to the thickness of the remaining walls about the opening 18. As seen in the drawing, the thickness of the base of slot 18 is less than half the radial thickness of the thickest part of the walls of the body part. To produce the Venturi an anvil 30 is inserted into opening 12. Anvil 30 is cylindrical except that it has a flat 31 on one side. The cylindrical part is slightly smaller than the diameter of passage 12 so that it can be inserted freely into and removed from the passage. The flat 31 slopes down towards the distal end of the anvil. The other end of the anvil is supplied with threads 32 to mate with corresponding internal threads on a barrel stop 33. In use, the stop 33 abuts the end of body part 11 and thereby determines just what part of the flat 31 is immediately opposite slot 18. The anvil has a handle 34 with suitable marking, i.e. projection 35, thereon to identify which side of the anvil the flat 31 is on. A punch 37 is employed. This punch is rectangular in cross section and is thin enough to be received within slot 18 with the walls 18a of the slot guiding the tool for proper positioning. In the opposite dimenson (as seen in FIG. 3), it is wide enough to extend across passage 12. The punch has a flat bottom 38, a relatively large flat 39 on the side that will be over orifice 17, and a relatively small flat 40 on the opposite side.

When oriented as shown in FIG. 2, the punch 37 is inserted into slot 18 with the flat bottom 38 against the wall immediately opposite the flat 31 of the anvil. Preferably, the opening 17 will already have been formed, but it could be formed after the step is made. The punch is then forced toward the anvil, as by means of a blow on the punch, to cause the metal to cold flow down against the flat 31 of the anvil to thereby define the step 16, as illustrated in FIG. 1. If, by performance checking, it is determined that the step 16 projects too far into the passage 12, the stop 23 on the anvil is adjusted so that the portion of flat 31 adjacent opening 17 is closer to the wall of the passage than before. Conversely, by moving the stop 23 to the left in FIG. 2, the flat 31 will be moved away from the inner wall of the body part 11 so that when the cold flow occurs the step 16 will extend farther into the passage 12 than before.

Thus, a high degree of accuracy can be obtained so far as the extent of the projection of the step into the passageway is concerned. This is important because it gives good control over the proportioning of the liquid 23 with regard to the amount of water from source 13.

In the illustrated embodiment, the body part 11 is formed of metal and a cold flow procedure is employed to form the step 16. Alternatively, the body part 11 could be formed of a thermoplastic and the punch 37 heated. In such case, the thermoplastic would be softened as the punch was pressed against it sufficiently to force the softened plastic against the anvil to define the step.

I claim:

1. A workpiece for use in making a body part which has a Venturi therein, said workpiece having two ends and an opening extending therethrough from one end to the other, a circumferential slot about the periphery of the body part and defining walls at each side of the slot and a base wall between the slot and the opening, said base wall having a radial thickness substantially less than half the radial thickness of the thickest part of the body part, said body defining an orifice through said base wall adjacent one of said side walls and spaced from the other of said side walls.

2. A workpiece as set forth in claim 1, wherein said orifice is the sole aperture extending through the body part from said opening to the periphery of the body part.

* * * * *